(12) United States Patent
Kaphengst et al.

(10) Patent No.: US 9,206,852 B2
(45) Date of Patent: Dec. 8, 2015

(54) SHAFT COUPLING ASSEMBLY AND METHOD

(71) Applicant: GM GLOBAL TECHNOLOGY OPERATIONS LLC, Detroit, MI (US)

(72) Inventors: Michael R. Kaphengst, Leonard, MI (US); Richard A. Knoth, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 171 days.

(21) Appl. No.: 13/875,543

(22) Filed: May 2, 2013

(65) Prior Publication Data

US 2014/0328613 A1    Nov. 6, 2014

(51) Int. Cl.
| | |
|---|---|
| *F16D 1/08* | (2006.01) |
| *F16D 1/06* | (2006.01) |
| *F16D 3/38* | (2006.01) |
| *F16D 1/116* | (2006.01) |
| *F16D 1/10* | (2006.01) |

(52) U.S. Cl.
CPC ............... *F16D 1/06* (2013.01); *F16D 1/0864* (2013.01); *F16D 3/387* (2013.01); *F16D 1/116* (2013.01); *F16D 2001/103* (2013.01); *Y10T 29/49947* (2015.01); *Y10T 403/1624* (2015.01); *Y10T 403/7035* (2015.01); *Y10T 403/7075* (2015.01); *Y10T 403/7188* (2015.01)

(58) Field of Classification Search
CPC ............ B21D 39/04; B62D 1/16; B62D 1/20; F16D 1/076; F16D 1/08; F16D 1/0805; F16D 1/0864; F16D 3/185; F16D 1/116; F16D 3/387; F16D 2001/103
USPC ......... 403/1, 14, 359.1–359.6, 398, 399, 376; 29/525.01
See application file for complete search history.

(56) References Cited

U.S. PATENT DOCUMENTS

| | | | | |
|---|---|---|---|---|
| 4,006,993 | A | * | 2/1977 | Woerlee ..................... 403/359.5 |
| 4,628,758 | A | * | 12/1986 | Yuzuriha et al. ........... 403/359.5 |
| 5,253,949 | A | * | 10/1993 | Oxley et al. .................... 403/317 |
| 5,628,578 | A | * | 5/1997 | McClanahan et al. ..... 403/359.5 |
| 5,816,113 | A | * | 10/1998 | Fohl ............................ 403/359.5 |
| 6,942,415 | B2 | | 9/2005 | Whitton et al. |
| 8,038,362 | B2 | * | 10/2011 | Kawanabe ..................... 403/14 |
| 8,052,535 | B2 | * | 11/2011 | Miyawaki .................. 403/359.6 |
| 2013/0102399 | A1 | * | 4/2013 | Kim .............................. 464/162 |

* cited by examiner

*Primary Examiner* — Josh Skroupa
(74) *Attorney, Agent, or Firm* — Quinn Law Group, PLLC

(57) ABSTRACT

A shaft coupling assembly retains a shaft end in a coupling element channel using a fastener inserted through a coupling element bore and a recess in an engagement segment of the shaft end to engage the coupling element to exert a clamping force on a shaft interface of the engagement segment. A projection having a smaller cross section than that of the shaft interface extends axially from the engagement segment and has sufficient length to protrude into the bore to interfere with fastener engagement prior to engagement of the shaft interface in the channel. A projection upper surface further interferes with the fastener bore to prevent engagement of the fastener when the shaft end has been engaged to the channel but not inserted to an installed position. The upper surface may be defined by an arcuate portion of the projection which may have a teardrop shaped cross section.

17 Claims, 8 Drawing Sheets

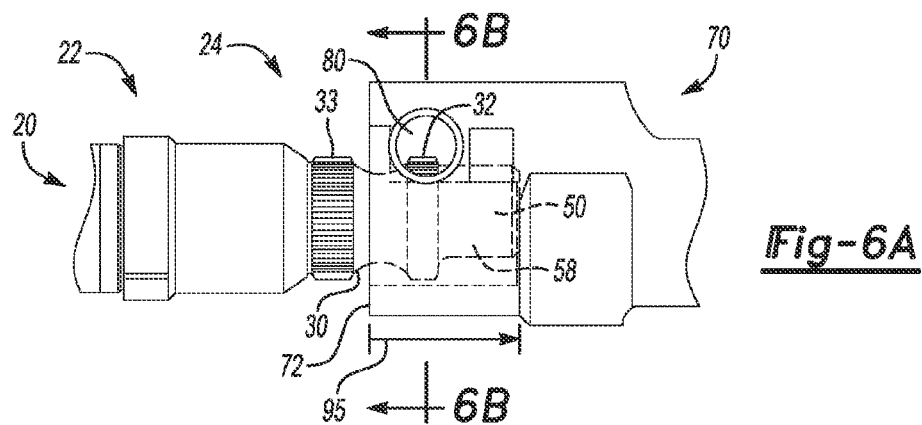
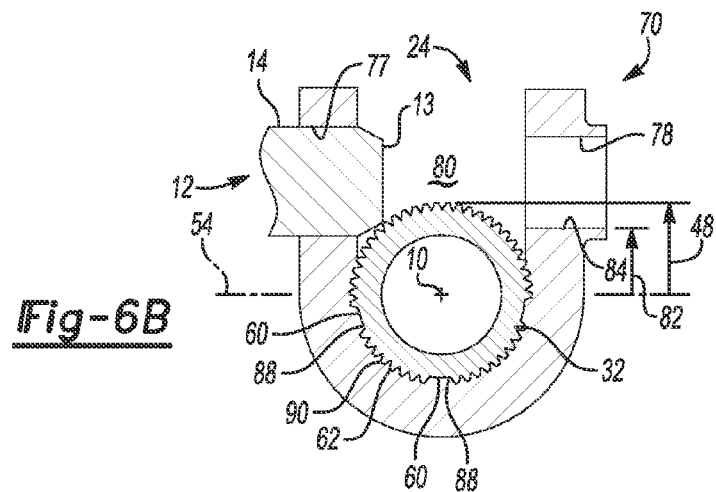
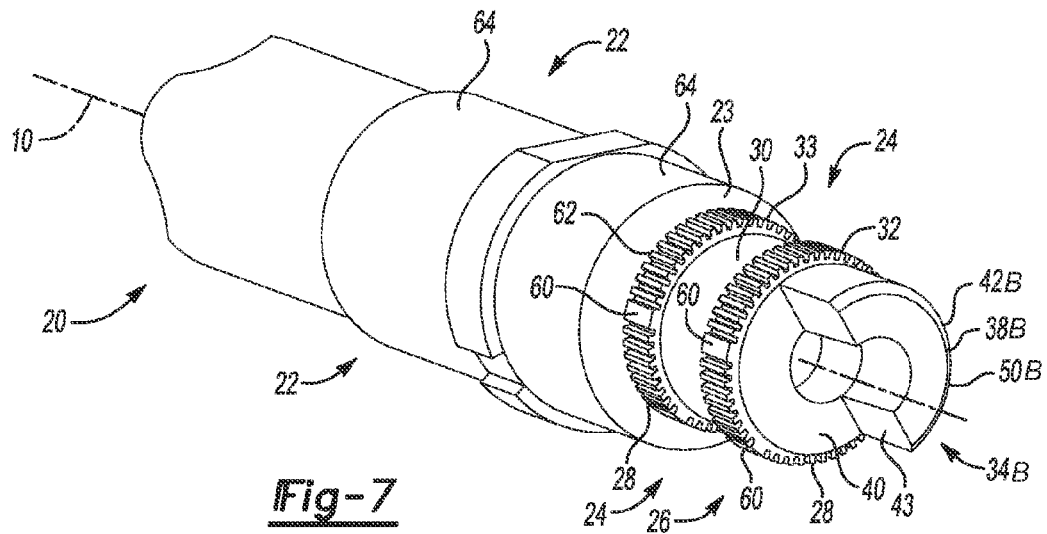

SHAFT COUPLING ASSEMBLY AND METHOD

TECHNICAL FIELD

The present invention relates to a shaft coupling assembly including a shaft and a coupling element.

BACKGROUND

Shafts are utilized in many applications and generally require interconnection between the shaft and a secondary component. The secondary component can be an independent component or a secondary shaft such that the interconnected shaft serves as an intermediate shaft. An end of the shaft may be interconnected with a coupling element which may in turn be interconnected with a secondary component, which may be another shaft.

In some applications, for example, a steering intermediate shaft, interconnection of the end of the shaft and the coupling element may be required in a location or under conditions of limited accessibility and/or visibility, such that visual verification of installation of the shaft end into the coupling element at the required installed depth and/or orientation may be difficult or impossible prior to and/or after inserting a retaining fastener, such as a retaining bolt, in a fastener bore and prior to and/or after engaging the inserted fastener to the coupling element. In this situation, an installer may manually manipulate the shaft relative to the coupling element after engaging the fastener to assess whether the shaft end and the coupling element are engaged, however such manipulation is subjective and may provide a false sense that an improperly inserted shaft end is properly installed.

SUMMARY

A shaft coupling assembly and method of assembly is described herein with the shaft coupling assembly configured such that a fastener cannot be inserted through a fastener bore defined by the coupling element and engaged without having one of two conditions present. In a first condition, the shaft end must be inserted to a required installed depth such that a fastener receiving recess defined by the shaft end is aligned with the fastener bore to receive the fastener inserted through the bore, where engagement of the fastener to the coupling element after insertion of the fastener through the fastener bore and the shaft causes the coupling element to exert a clamping force on a shaft interface defined by the shaft end while the fastener fixedly positioned in the recess cooperates with the clamping force to engage the shaft end in the coupling element and to prevent axial and radial movement of the shaft end relative to the coupling element.

In a second condition, a projection extending axially from an engagement segment of the shaft end is inserted in the coupling element without engaging the engagement segment to the coupling element and protrudes into the fastener bore, such that insertion of the fastener in the fastener bore interferes with the projection to displace the shaft end axially relative to the coupling element, which may provide a visual indicator that the shaft end is not engaged to the coupling element. The projection may be displaced into a clearance gap established between the projection and a coupling interface of the coupling element, where projection and/or the clearance gap is configured such that, should the fastener be inserted through the fastener hole and engaged to the coupling element, the projection remains unengaged with the coupling interface, and as such the shaft end is readily removable from the coupling element upon manual manipulation of the shaft relative to the coupling element, e.g., such that the unengaged condition of the shaft end is obvious and/or highly detectable.

An assembly method is provided herein, where the shaft end is progressively inserted into a channel of the coupling element defining a coupling interface, where the channel is in communication with the fastener bore of the coupling element, such that at an insertion depth less than that required to engage an engagement segment of the shaft end with the coupling interface the projection cannot be engaged to the coupling interface, as described previously, and at each insertion depth with the engagement segment engaged with the coupling interface, other than the required installed depth, a feature of the shaft end protrudes into the fastener bore to prevent insertion of the fastener through the fastener bore, thereby preventing engagement of the fastener to the coupling element with the shaft end in a non-installed position.

The shaft provided herein includes a shaft body and a shaft end. The shaft end includes an engagement segment extending axially from the shaft body and defining a shaft interface and a fastener receiving recess. A projection extends axially from the engagement segment and has a cross-sectional area less than that of the shaft interface such that the projection is noncontiguous with the shaft body. A coupling element includes a shaft receiving end, a channel defining a coupling interface corresponding to the shaft interface, and opposing bore apertures defining a fastener bore, arranged such that the channel is in communication with the shaft receiving end and the fastener bore. The projection has a projection length greater than the axial length of the channel intermediate the shaft receiving end and the fastener bore such that with the shaft end inserted into the channel via the shaft receiving end, the leading end of the projection protrudes into the bore without engaging the leading portion of the shaft interface with the coupling interface.

A transition surface on the shaft end bounded by a leading interface portion of the engagement segment and the projection defines a clearance gap between the projection and the coupling interface with the projection inserted into the channel. The projection has an upper surface characterized by a projection radial height defined relative to a longitudinal axis of the shaft, wherein the projection radial height is greater than a bore radial height of the fastener bore defined by a bottom of the fastener bore and a longitudinal axis of the channel.

The projection may define a transverse cross-section having an arcuate portion defining the upper surface, where the arcuate portion is subtended by an angle of 170 degrees or less originating from a longitudinal axis of the shaft. In one example, the projection may be positioned completely above a horizontal mid-plane of the shaft body. In another example, the projection may have a teardrop shaped cross-section including the arcuate portion and a V-shaped portion contiguous with the arcuate portion such that the V-shaped portion extends through a horizontal mid-plane of the shaft body.

The shaft coupling assembly may include a shaft orientation feature defined by the engagement segment and a coupling orientation feature defined by the coupling interface, such that with the shaft end inserted into the channel with the shaft interface engaged with the coupling interface, the shaft orientation feature and the coupling orientation feature are engaged to orient the shaft end in the channel such that the upper surface of the projection protrudes into the fastener bore. In one example, each of the shaft interface and the coupling interface may define a plurality of orientation features such that engaging the engagement segment to the coupling interface may require engaging a plurality of corresponding orientation features. Each of the shaft interface and the coupling interface may include a plurality of teeth engageable in the installed position.

The configuration of the shaft end and coupling element described herein enables verification of the shaft end in the installed position prior to engaging the inserted fastener to the coupling element and without visual verification, and therefore enables assembly of a shaft coupling assembly in an application and/or installation location where visually accessibility of the shaft end and coupling element may be limited or not possible.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 6A is a partial schematic side view showing the shaft of FIG. 1 partially inserted into the coupling element in a third position;

FIG. 6B is a schematic cross-sectional view of section 6B-6B of FIG. 6A;

FIG. 7 is a partial schematic perspective end view of a shaft including a second example projection extending from an engagement portion;

DETAILED DESCRIPTION

Figure 1:
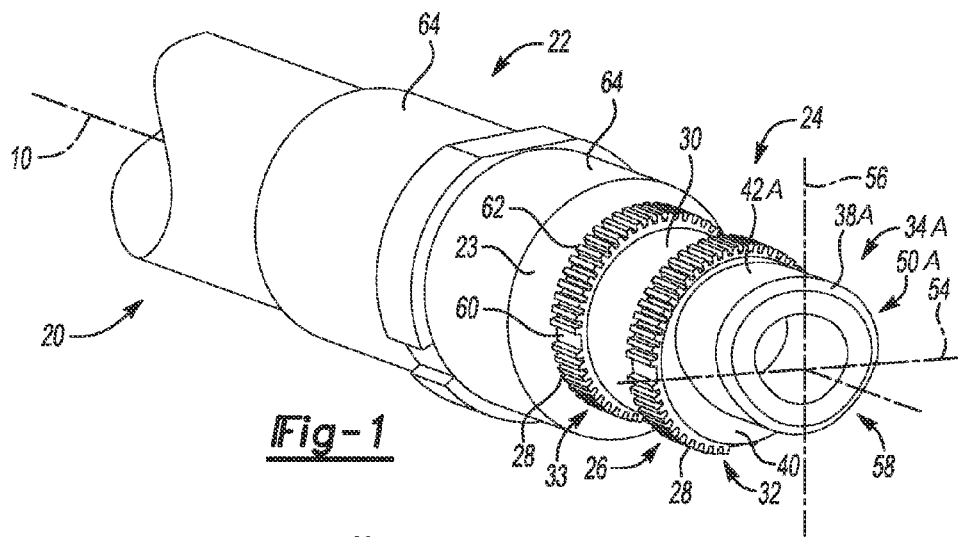
FIG. 1 is a partial schematic perspective end view of a shaft including a first example projection extending from an engagement portion.

Referring to the drawings wherein like reference numbers represent like components throughout the several figures. The elements shown in FIGS. 1-12D are not to scale or proportion. Accordingly, the particular dimensions and applications provided in the drawings presented herein are not to be considered limiting. Certain terminology, for example, "upper," "lower," "clockwise," "counterclockwise," "horizontal," "vertical," is used herein for relative descriptive clarity only and is not intended to be limiting.

Figure 2A:
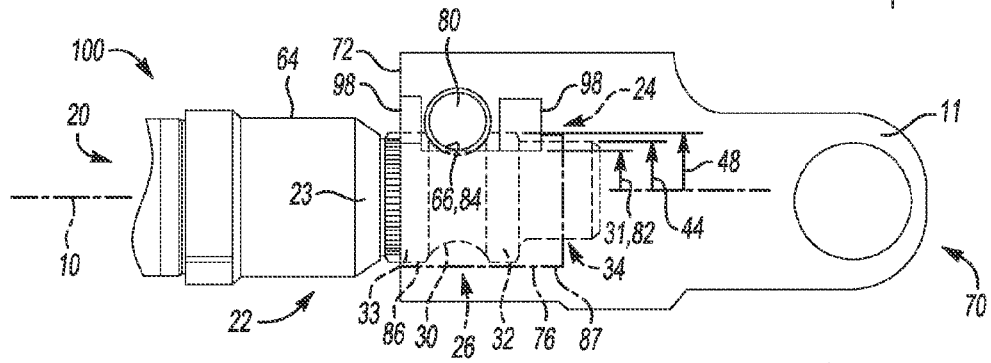
FIG. 2A is a partial schematic side view of a shaft coupling assembly including the shaft of FIG. 1 and a coupling element, and showing the shaft in a fully engaged position relative to the coupling element.

Referring to FIG. 1, a shaft 20 is shown generally indicated at 20. The shaft 20 includes a shaft body 22 and a shaft end 24. The shaft 20 may be assembled to a coupling element generally indicated at 70 in FIG. 2A where in the installed position shown in FIGS. 2A-2C the shaft end 24 is inserted to an installed depth 96 such that an engagement segment 26 is engaged in a channel 74 defined by the coupling element 70 and the shaft end 24 is retained in the installed position in the channel 74 by a fastener 12 inserted through a fastener bore 80 defined by the coupling element 70 and a fastener receiving recess 30 defined by the shaft end 24, where the fastener 12 engages the coupling element 70 as shown in FIG. 2C to cause a coupling interface 76 of the coupling element 70 to exert a clamping force 18 on a shaft interface 28 of the engagement segment 26 of the shaft end 24, thus forming a shaft coupling assembly generally indicated at 100. In a non-limiting example, the shaft coupling assembly 100 may be configured for use as a steering shaft coupling assembly 100, where the shaft 20 may be configured as a steering shaft 20 or a steering intermediate shaft 20.

As used herein, "installed position," "installed depth 96," and "installed orientation" shall refer only to a specific condition where the shaft end 24 is positioned and/or oriented relative to the coupling element 70 as required for proper engagement of the shaft end 24 to the coupling element 70 by a fastener 12 inserted through the fastener bore 80 and engaged to the coupling element 70. Other terms not including the word "installed," such as "inserted position," "insertion depth," and "inserted orientation" shall refer to conditions where the shaft end 24 is not positioned and/or is not oriented relative to the coupling element 70 as required for proper engagement of the shaft end 24 to the coupling element 70 by a fastener 12 inserted through the fastener bore 80 and engaged to the coupling element 70. Throughout the figures, the terms "upper," "lower," and "bottom" shall be relative to a horizontal mid-plane defined by a shaft longitudinal axis 10 and a shaft horizontal axis 54 shown in FIG. 1 and FIG. 3A, where with the shaft end 24 engaged with the coupling element 70 in the installed position shown in FIGS. 2A-2C, the longitudinal axis 10 of shaft 20 and the longitudinal axis 10 of the channel 74 of the coupling element 70 are substantially coincident, and the horizontal axis 54 and horizontal mid-plane is substantially parallel to the axis of a fastener bore 80 defined by the coupling element 70, where the terms "substantially coincident" and "substantially parallel" are intended to be interpreted, respectively, as "coincident" and "parallel" within the customary manufacturing tolerances of the respective components such that these terms are not overly broad. A vertical axis 56 is orthogonal to and bisects the longitudinal and horizontal axes 10, 54. The terms "clockwise" and "counterclockwise" as used in here shall refer to the direction of rotation about the longitudinal axis 10 as viewed from the perspective of section 12-12 shown in FIG. 2B.

As shown in FIG. 1, the shaft 20 includes a shaft body generally indicated at 22 and a shaft end generally indicated at 24. The shaft body 22 has a shaft diameter 21 (see FIG. 3B) which defines a shaft surface 64. In the example shown the shaft surface 64 terminates in a chamfer 23, such that the shaft diameter 21 is larger than a shaft interface diameter 46 (see FIG. 3B) where the larger shaft diameter 21 and the chamfer 23 may interfere with a shaft receiving end 72 of the coupling element 70 to prevent over insertion of the shaft end 24 into the channel 74 of the coupling element 70, e.g., insertion of the shaft end 24 to an insertion depth greater than the installed depth 96 shown in FIG. 2B.

The shaft end 24 extends axially from the shaft body 22 and includes an engagement segment 26 and a projection 34, indicated as projection 34A in FIG. 1. The engagement segment 26 extends axially from the shaft body 22 and defines a shaft interface 28 including a leading interface portion 32, a trailing interface portion 33, and a fastener receiving recess 30 intermediate the leading interface portion 32 and the trailing interface portion 33. The fastener receiving recess 30, referred to herein as the recess 30, is configured such that in the installed position shown in FIGS. 2A-2C, the recess 30 defines a recess bottom 66 and a recess 30 profile which is non-interfering with the fastener bore 80 such that in the installed position a fastener 12 may be inserted through the fastener bore 80 and received in the recess 30. The recess 30 has a recess radial height 31 which is defined by the shaft longitudinal axis 10 and the recess bottom 66. As shown in FIG. 2A, the recess radial height 31 in a non-interfering condition with the fastener bore 80 may be the same as or less than a bore radial height 82 defined by the fastener bore 80 bottom and the longitudinal axis 10. In one example, the recess radial height 31 and the fastener bore radial height 82 are substantially the same, e.g., the same within customary manufacturing tolerance of the components, such that in the installed position the recess 30 partially defines the fastener bore 80.

As shown in FIG. 2C, in the installed position a shank portion 14 of the fastener 12 interferes with the shaft interface portions 32, 33 of the engagement segment 26 to retain the shaft end 24 in the coupling element 70 and to prevent axial movement of the shaft end 24 relative to the coupling element 70. In the example shown the recess 30 is configured as an annular groove. The example is non-limiting and it would be understood that other configurations of the recess 30, for example, a recess 30 in the shape of a slot or whistle-notch, may be used.

The shaft interface 28 of the engagement segment 26 is configured to engage with a coupling interface 76 defined by the coupling element 70, such that in the installed position and with the fastener 12 extended through the fastener bore 80 and engaged with the coupling element 70, the coupling interface 76 exerts a clamping force 18 on the shaft interface 28 to retain the shaft end 24 in the coupling element 70 to prevent axial movement of the shaft end 24 relative to the coupling element 70. The shaft interface 28 and/or the coupling interface 76 may include surface features 60, 88, 98 for engaging and/or orienting the shaft interface 28 with the coupling interface 76. In the example shown, the shaft interface 28 includes a plurality of shaft teeth 62 corresponding to a plurality of coupling teeth 90 (see FIGS. 4B and 5B) such that with the shaft end 24 inserted into the channel 74 of the coupling element 70 at an insertion depth sufficient to engage the shaft interface 28 and the coupling interface 76, the shaft teeth 62 engagingly mesh with the coupling teeth 90 to radially orient the shaft end 24 to the channel 74 and/or to prevent radial movement of the shaft interface 28 relative to the coupling interface 76. The engagement segment 26 and/or the shaft interface 28 may include a shaft orientation feature 60 which may correspond to a coupling orientation feature 88 (see FIG. 5B) defined by the channel 74 and/or the coupling interface 76 of the coupling element 70. The shaft orientation feature 60 and coupling orientation feature 88 may be configured as a key and keyway, as a groove and blocked tooth, or as other corresponding features 60, 88, 98 such that with the fastener end 13 inserted into the coupling element 70 at an insertion depth where the engagement segment 26 is engaged with the channel 74, the shaft orientation feature 60 and the coupling orientation feature 88 are engaged to radially orient the shaft end 24 in the channel 74. The engagement segment 26 may define a plurality of shaft orientation features 60 and/or the channel 74 may define a plurality of coupling orientation features 88 arranged such that engagement of more than one of the shaft orientation features 60 must be aligned with a corresponding coupling orientation feature 88 for the shaft end 24 to be inserted into the channel 74 to engage the leading interface portion 32 of the shaft interface 28 and a receiving interface portion 86 (see FIG. 2A) of the coupling interface 76.

Figure 3C:
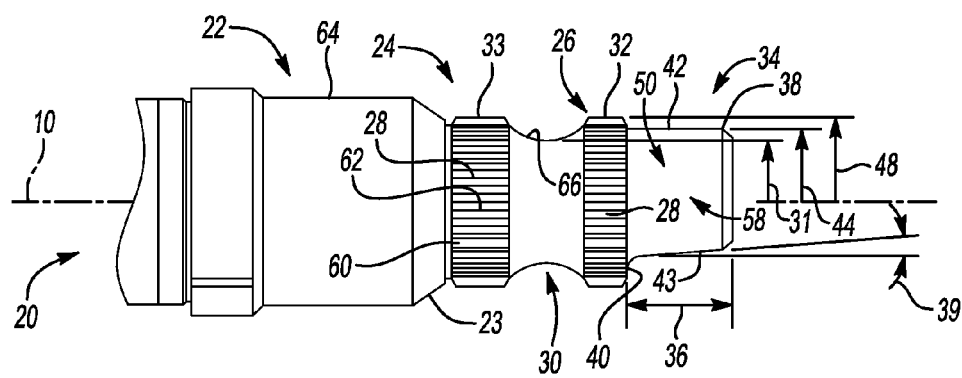
FIG. 3C is a partial schematic side view of the shaft of FIG. 1.
Figure 4A:
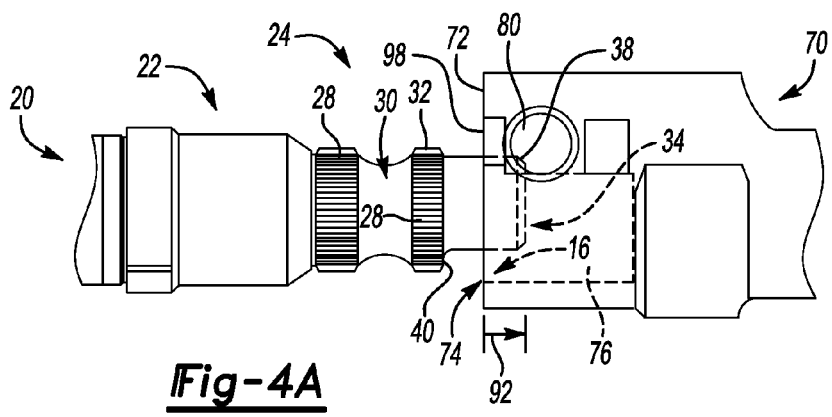
FIG. 4A is a partial schematic side view showing the shaft of FIG. 1 partially inserted into the coupling element in a first position.
Figure 4B:
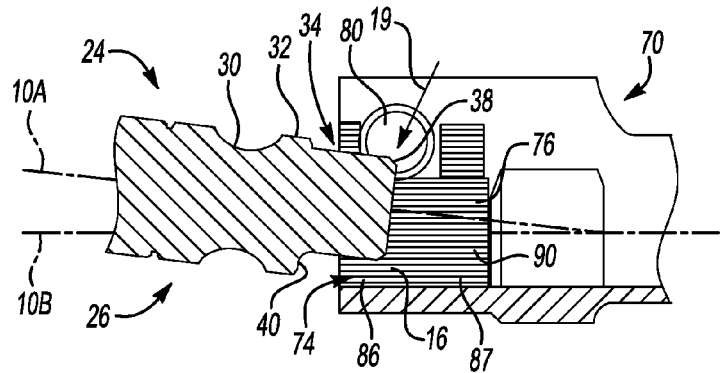
FIG. 4B is a partial cross-sectional view of section 4B-4B of FIG. 2B showing the shaft of FIG. 1 partially inserted into the coupling element in the first position.

Referring again to FIG. 1, the shaft end 24 includes the projection 34 extending axially from the leading interface portion 32 of the engagement segment 26 and having a cross-sectional area less than a cross-sectional area of the leading interface portion 32 and defining a transition surface 40 bounded by the leading interface portion 32. The projection 34 is characterized by a projection length 36 (see FIG. 3C) and defines a leading end 38 indicated as leading end 38A in FIG. 1, which is presented to the shaft receiving end 72 of the coupling element 70 during insertion of the shaft end 24 into the channel 74 of the coupling element 70. As shown in FIG. 4A, the projection length 36 of the projection 34 is greater than the axial length of the channel 74 intermediate the shaft receiving end 72 and the fastener bore 80, e.g., greater than the axial length of a receiving interface portion 86 of the coupling interface 76, such that with the shaft end 24 inserted into the channel 74 via the shaft receiving end 72, the leading end 38 of the projection 34 protrudes into the bore without engaging the leading portion of the shaft interface 28 with the coupling interface 76. As shown in FIG. 4B, with the shaft end 24 inserted to a first insertion depth 92 such that the leading end 38 of the projection 34 protrudes into the bore without engaging the engagement segment 26 and the coupling interface 76, a displacing force 19 may be exerted on the protruding leading end 38 by the fastener 12 inserted into the fastener bore 80, causing the projection 34 to be displaced into the clearance gap 16 defined by the transition surface 40 and the coupling interface 76. The displacement of the shaft end 24 by the fastener 12 inserted in the coupling element 70 may skew the shaft longitudinal axis (shown as 10A in FIG. 4B) relative to coupling longitudinal axis 10 (shown as 10B in FIG. 4B), providing a visual indicator that the shaft end 24 is not engaged with the coupling element 70.

The projection 34 further defines an upper surface 42, indicated as upper surface 42A in FIG. 1, and a lower surface 43 such that in the installed orientation, the shaft end 24 is presented to the channel 74 with the leading end 38 and the upper surface 42 generally aligned with the open side of the channel 74, e.g., generally aligned between opposing walls 73 of the coupling element 70 defining the channel 74, and such that upon insertion of the projection 34 into the channel 74, the transition surface 40 defines a clearance gap 16 (see FIG. 4A) between the projection 34 and the coupling interface 76, and the upper surface 42 is adjacent the fastener bore 80. The lower surface 43 may be tapered as shown in FIG. 3C, where the taper angle 39 originates from the transition surface 40, and such that tapering of the lower surface 43 increases the clearance gap 16 relative to an untapered lower surface.

Figure 3A:
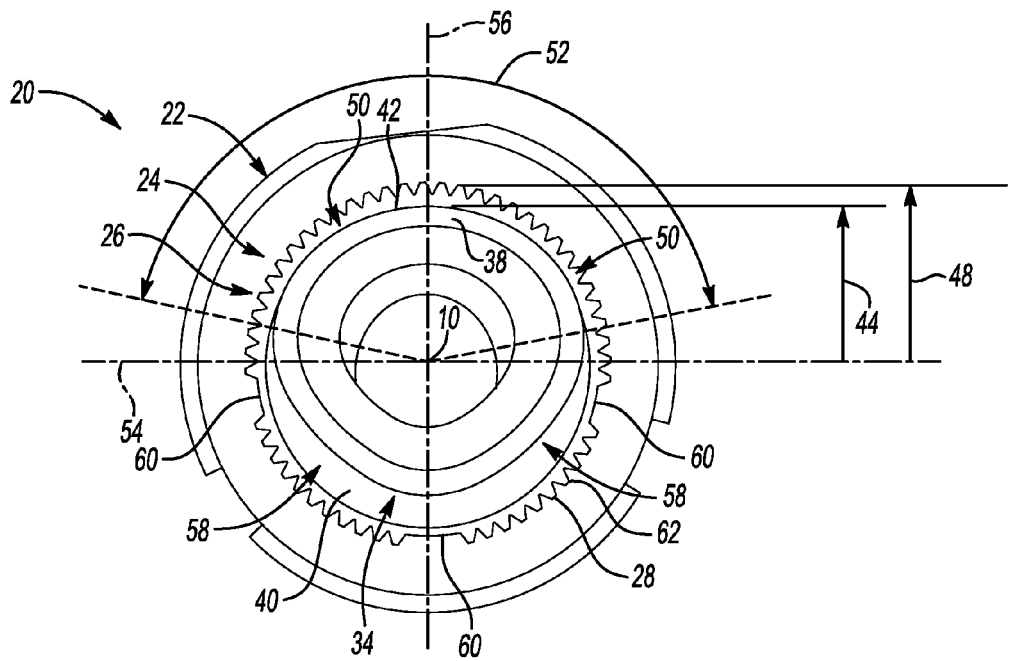
FIG. 3A is a schematic end view of the shaft of FIG. 1.
Figure 5A:
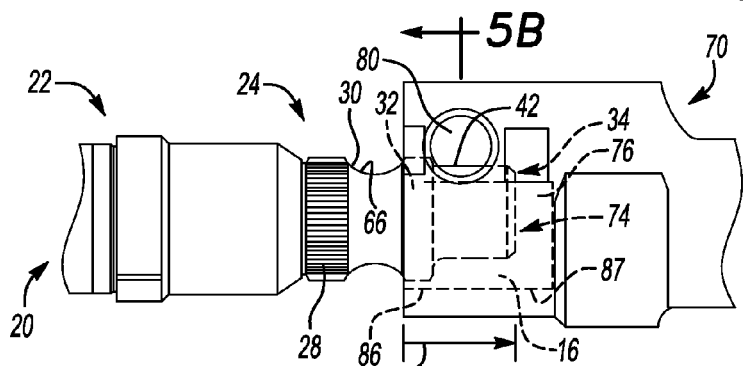
FIG. 5A is a partial schematic side view showing the shaft of FIG. 1 partially inserted into the coupling element in a second position.
Figure 5B:
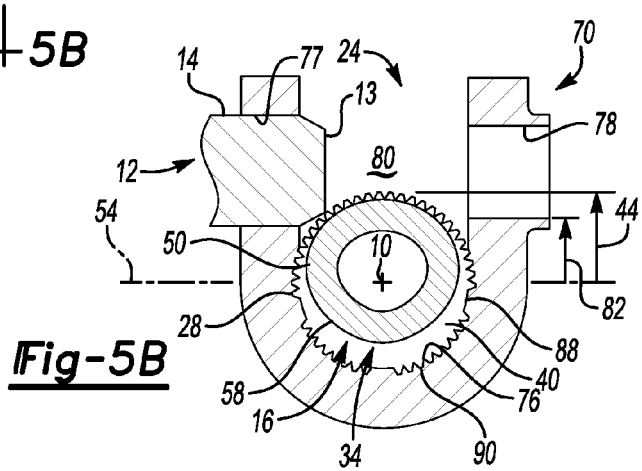
FIG. 5B is a schematic cross-sectional view of section 5B-5B of FIG. 5A showing a transverse cross-section of the projection.

As shown in FIGS. 3A and 5A-5B, the engagement segment 26 may define one or more shaft orientation features 60 and the coupling interface 76 may define one or more coupling orientation features 88 corresponding to the one or more shaft orientation features 60 where engaging the one or more shaft orientation features 60 with the one or more coupling orientation features 88 orients the shaft end 24 in the channel 74 such that the upper surface 42 of the projection 34 protrudes into the fastener bore 80 to prevent insertion of the fastener 12 through the bore opening, for example, when the shaft end 24 is inserted to a second insertion depth 94, where the second insertion depth 94 corresponds to engagement of the leading interface portion 32 of the shaft interface 28 and the receiving interface portion 86 of the coupling interface 76.

The projection 34 upper surface 42 may be characterized by a projection radial height 44 defined relative to a longitudinal axis 10 of the shaft 20, as shown in FIG. 2A, where the projection radial height 44 is greater than the bore radial height 82, and such that with the leading interface portion 32 of the engagement segment 26 engaged with the receiving interface portion 86 of the channel 74, the projection 34 upper surface 42 protrudes into the bore opening to prevent insertion of the fastener 12 through the bore opening, as shown in FIGS. 5A and 5B. As shown in FIG. 2A, the projection radial height 44 may be less than a shaft interface radial height 48 defined by the leading interface portion 32 and the longitudinal axis 10 of the shaft 20, such that the projection 34 upper surface 42 in the example shown is noncontiguous with the shaft interface 28.

Figure 3B:
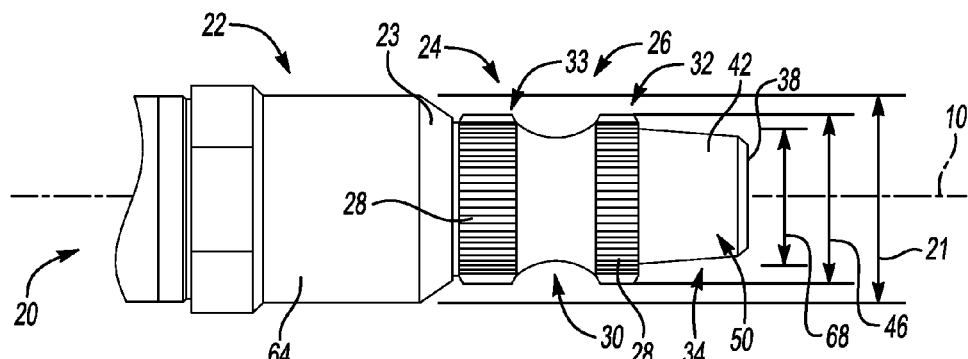
FIG. 3B is a partial schematic top view of the shaft of FIG. 1.

The projection 34 may define a transverse cross-section having an arcuate portion 50, indicated as an arcuate portion 50A in FIG. 1, where the arcuate portion 50 defines the upper surface 42 of the projection 34. The arcuate portion 50 may be subtended by an angle 52 of less than 180 degrees, the angle 52 originating from a longitudinal axis 10 of the shaft 20, as shown in the FIG. 3A, and such that the arcuate portion 50 is positioned completely above the horizontal mid-plane of the shaft body 22. In a preferred embodiment, the arcuate portion 50 is subtended by an angle 52 of less than 170 degrees, such that the projection width 68 measured parallel to the horizontal axis 54, as shown in FIG. 3B, is less than the shaft interface diameter 46, such that the transition surface 40 bounded therebetween defines a clearance gap 16 which includes lateral clearance between the projection 34 and the coupling interface 76 in and adjacent to the horizontal mid-plane with the shaft end 24 inserted in the channel 74.

In a first example shown in FIGS. 1-6B, the projection 34 includes a V-shaped portion 58 contiguous with the arcuate portion 50 and extending from the arcuate portion 50 through a horizontal mid-plane of the shaft body 22 such that the transverse cross-section of the projection 34 is teardrop-shaped. In another example shown in FIGS. 7-12D, the arcuate portion 50 terminates in a lower surface 43 such that the projection 34 is positioned completely above the horizontal mid-plane of the shaft body 22. The arcuate portion 50 is subtended by an angle 52 of less than 180 degrees and preferably 170 degrees or less, with the subtending angle 52 originating from the longitudinal axis 10 of the shaft 20. The projection 34 may be formed by one of swaging, extrusion, machining or other suitable method.

Figure 2B:
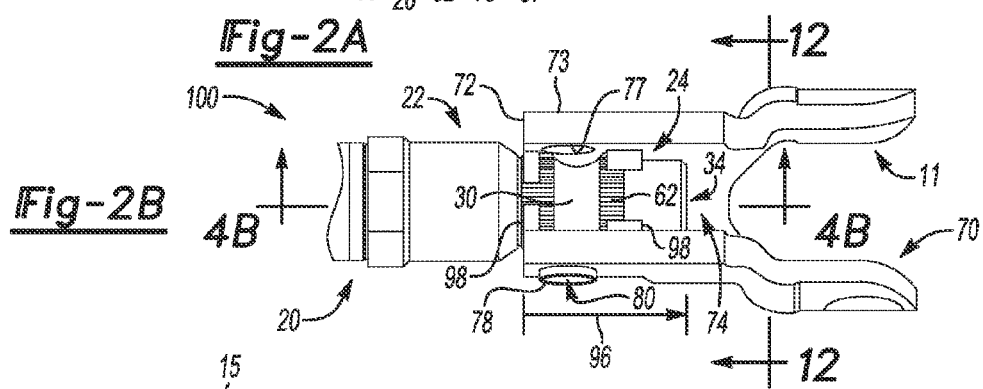
FIG. 2B is a partial schematic perspective top view of the shaft coupling assembly of FIG. 2A.
Figure 2C:
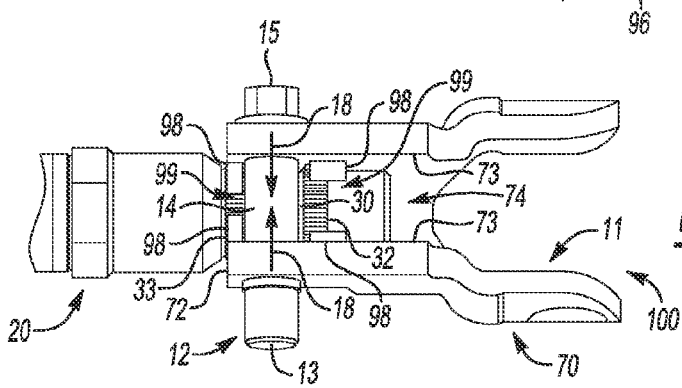
FIG. 2C is a partial schematic perspective top view of the shaft coupling assembly of 2B with a fastener in an installed position.

Referring to FIGS. 2A-2C the coupling element 70 includes a shaft receiving end 72 in communication with the channel 74 configured to receive and engage the shaft end 24, where the channel 74 defines a coupling interface 76 corresponding to the shaft interface 28. The coupling element 70 may further define a connecting end 11 which may be configured to connect to another component (not shown) such that the coupling element 70 operatively connects the shaft 20 to the component, where the other component may be another shaft 20 (not shown) or a different component. The shaft end 24 may be received into the channel 74 via the shaft receiving end 72, where the shaft end 24 may be inserted into the channel 74 to various depths 92, 94, 95, 96 as described further herein. The coupling element 70 includes opposing walls 73 defining the channel 74, each wall 73 including a bore aperture such that the bore apertures 77, 78 collectively define the fastener bore 80 in communication with the channel 74. In the example shown, the bore bottom 84 extends into the channel 74, such that when the shaft end 24 is installed in the coupling element 70 in the installed position, e.g., at an installed depth 96, the bore bottom 84 extends into the recess 30 and/or aligns with the recess bottom 66.

The receiving bore aperture 77 is configured to receive a fastener end 13 and shank portion 14 of the fastener 12, while retaining a fastener head 15 of the fastener 12. The engaging bore aperture 78 is configured to receive the fastener end 13 and engage the fastener 12 to the coupling element 70, where the fastener 12 may be engaged to the coupling element 70 such that a clamping force 18 is exerted by the coupling interface 76 on the shaft interface 28, for example, by engaging the fastener 12 to the coupling element 70 to draw the opposing walls 73 of the coupling element 70 toward each other, e.g., in the direction shown in FIG. 2C by the arrows indicating the clamping force 18. In one example, the fastener 12 may be configured as a threaded bolt and the engaging bore aperture 78 may be configured such that the threaded bolt may be engaged with the engaging bore aperture 78 to generate a prevailing torque thereby engaging the bolt fastener 12 to the coupling element 70, where the prevailing torque corresponds to the clamping force 18 exerted by the coupling interface 76 on the shaft interface 28. The example shown herein is not limiting, and it would be understood that other types of fasteners 12 and/or fastener 12 combinations may be used to engage the recess 30 via the fastener bore 80 and/or to retain the shaft end 24 to the coupling element 70 in an installed position. By way of non-limiting example, the fastener 12 may include a bolt having a prevailing torque element such as a locking screw thread, a torque prevailing coating such as Loctite™, a locking insert such as Nylok™, or a bolt and nut and/or cotter pin combination, etc.

The coupling interface 76 is defined by the channel 74 and includes a receiving interface portion 86 and a terminating interface portion 87. The receiving interface portion 86 is intermediate the shaft receiving end 72 and the fastener bore 80 and receives the projection 34 prior to engaging the leading interface portion 32 of the shaft 20 engagement segment 26. The fastener bore 80 is intermediate the receiving interface portion 86 and the terminating interface portion 87, such that the terminating interface portion 87 engages the leading interface portion 32 of the engagement segment 26 when the shaft end 24 is in the installed position, e.g., when the shaft end 24 is positioned in the channel 74 at the installed depth 96 as shown in FIGS. 2A-2C.

In the example shown, the coupling interface 76 includes a plurality of coupling teeth 90 (see FIGS. 4B and 5B) corresponding to a plurality of shaft teeth 62 such that with the shaft end 24 inserted into the channel 74 of the coupling element 70 at an insertion depth 94 sufficient to engage the shaft interface 28 and the coupling interface 76, the shaft teeth 62 engagingly mesh with the coupling teeth 90 to radially orient the shaft end 24 to the channel 74 and/or to prevent radial movement of the shaft interface 28 relative to the coupling interface 76. As described previously and shown in FIGS. 5B and 6C, and the coupling interface 76 may define one or more coupling orientation features 88 corresponding to the one or more shaft orientation features 60 where engaging the one or more shaft orientation features 60 with the one or more coupling orientation features 88 orients the shaft end 24 in the channel 74 such that the leading end 38 and the upper surface 42 of the projection 34 protrudes into the fastener bore 80 as the shaft end 24 is progressively inserted into the channel 74 to prevent insertion of the fastener 12 through the bore opening when the shaft end 24 is inserted in the channel 74 but not in the installed position, for example, when the shaft end 24 is inserted to a first insertion depth 92 shown in FIG. 4A or progressively inserted to a second insertion depth 94 shown in FIG. 5B.

Figure 12A:
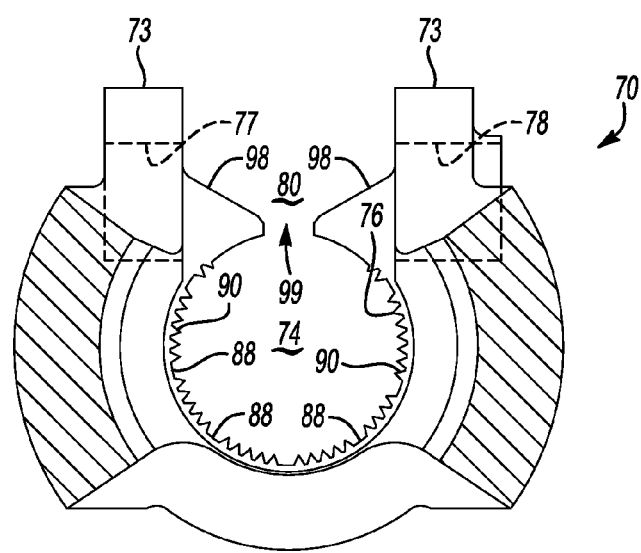
FIG. 12A is a schematic cross-sectional view of section 12-12 of the coupling element of FIG. 2B without a shaft.

As shown in FIGS. 2A-2C and referring to FIG. 12A, the coupling element 70 may define a plurality of retention features 98, where each retention feature 98 may partially define the channel 74 and/or the coupling interface 76 as shown in FIG. 4B, and may be configured to guide and/or axially align the shaft end 24 as the shaft end 24 is progressively inserted into the channel 74. With the shaft end 24 installed in the installed position as shown in FIGS. 2A-2C, the retention features 98 engage the shaft interface 28 and, when the fastener 12 engages the coupling element 70, exert a clamping force 18 on the shaft interface 28 when the engaging fastener 12 draws the opposing walls 73 and the opposing retention features 98 of the coupling element 70 toward each other, e.g., in the direction shown in FIG. 2C by the arrows indicating the clamping force 18. The retention features 98 are configured to define a radial space 99 there between, such that as the retention features 98 and the opposing walls 73 are drawn together by the fastener 12 engaging the coupling element 70 with the shaft end 24 in the installed position, the radial space 99 is maintained to prevent interference of the opposing retention features 98 with each other, thereby preventing a false indication of engagement of the fastener 12 with the coupling element 70 and/or of engagement of the shaft end 24 with the coupling element 70 attributable to the interference of the opposing retention features 98.

In the example shown, the coupling element 70 includes a first pair of opposing retention features 98 adjacent the shaft receiving end 72 of the coupling element 70, where the retention features 98 partially define the coupling interface 76. The retention features 98 extend radially toward each other such that when the leading end 38 of the projection 34 is inserted into the channel 74 as shown in FIG. 4A, the projection 34 is guided by and/or positioned relative to the first pair of retention features 98 such that at the first insertion depth 92 shown in FIG. 4A, the leading edge of the projection 34 protrudes into the fastener bore 80. As shown in FIG. 4B, when a fastener 12 is inserted into the fastener bore 80, the protruding leading edge of the projection 34 interferes with a fastener 12 (not shown in FIG. 4B) and the fastener 12 exerts a displacing force 19 on the fastener 12, axially displacing the projection 34 from the fastener bore 80 now containing the inserted fastener 12 (not shown in FIG. 4B), such that the projection 34 is displaced into the clearance gap 16 defined by the transition surface 40 of the engagement segment 26 and the coupling interface 76. The projection 34 end may rotate relative to the first pair of retention features 98 such that the shaft end 24 is skewed relative to the channel 74, as shown in FIG. 4B by the shaft longitudinal axis 10 (indicated as 10A) skewed to the channel 74 longitudinal axis 10 (indicated as 10B), thus providing a visual indicator to an installer that the shaft end 24 has not been engaged in an installed position in the coupling element 70.

The projection 34 displaced into the clearance gap 16 may remain inserted in the channel 74 with the engagement segment 26 disengaged from the channel 74, such that as the fastener 12 now inserted in the fastener bore 80 is engaged with the coupling element 70, the walls 73 of the coupling element 70 and the opposing retention features 98 are drawn together and toward the projection 34 positioned in the channel 74. As the walls 73 are initially drawn together, the clearance gap 16 provided by the transition surface 40 prevents the drawn together walls 73 and coupling interface 76 from retaining the projection 34 in the channel 74. In the absence of an engaged shaft interface 28 to resist the clamping force 18, the opposing walls 73 and opposing retention features 98 are further drawn together by the engaging fastener 12 until the radial space 99 between the opposing retention features 98 is eliminated and interference of the opposing retention features 98 with each other provides a resisting force such that further engagement of the fastener 12 is ceased. The retention features 98, the radial space 99, and the transition surface 40 may be configured and/or sized such that, in the absence of the engagement segment 26 engaged with the coupling interface 76, the retention features 98 interfere with each other during engagement of the fastener 12 with the coupling element 70 prior to engagement of the projection 34 by the coupling interface 76, and such that it may be obvious to an installer that the shaft end 24 is not engaged in an installed position in the coupling element 70. The shape and size of the clearance gap 16 defined by the transition surface 40 contributes to preventing engagement of the projection 34 by the coupling interface 76 by providing sufficient clearance such that the projection 34 can be radially displaced within the channel 74 relative to the channel 74 longitudinal axis 10, e.g., such that the arcuate portion 50 is subtended to provide lateral clearance between the projection 34 and the shaft interface 28 at and proximate to the horizontal axis 54 of the shaft 20.

In the example shown, the coupling element 70 includes a second pair of opposing retention features 98 which partially define the terminating interface portion 87 such that the fastener bore 80 is intermediate the first and second pairs of retention features 98. The second pair of retention features 98 may cooperate to guide the projection 34 and/or the leading interface portion 32 as the shaft end 24 is progressively inserted in the channel 74, and/or may be configured to exert a clamping force 18 on the leading interface portion 32 with the shaft end 24 in the installed position. As described previously, a radial space 99 is provided between the opposing retention features 98 to prevent interference of the retention features 98 when the fastener 12 engages the coupling element 70 and the shaft end 24 in the installed position.

Referring now to FIGS. 4A-6B, a method of assembling the shaft coupling assembly 100 is illustrated, the method including progressively inserting the shaft end 24 of the shaft 20 into the channel 74 via the shaft receiving end 72 of the coupling element 70 from a first insertion depth 92 to a final installed depth 96. As shown in FIG. 4A, the projection length 36 of the projection 34 is greater than the axial length of the channel 74 intermediate the shaft receiving end 72 and the fastener bore 80, e.g., greater than the axial length of a receiving interface portion 86 of the coupling interface 76, such that with the shaft end 24 inserted into the channel 74 at the first insertion depth 92 the leading end 38 of the projection 34 protrudes into the bore without engaging the leading interface portion 32 of the shaft interface 28 with the coupling interface 76.

As shown in FIG. 4B, with the shaft end 24 inserted to the first insertion depth 92 such that the leading end 38 of the projection 34 protrudes into the bore without engaging the engagement segment 26 and the coupling interface 76, a displacing force 19 may be exerted on the protruding leading end 38 by the fastener 12 inserted into the fastener bore 80, causing the projection 34 to be displaced into the clearance gap 16 defined by the transition surface 40 and the coupling interface 76. The displacement of the shaft end 24 by the fastener 12 inserted in the coupling element 70 may skew the shaft longitudinal axis 10 (shown as 10A in FIG. 4B) relative to coupling longitudinal axis 10 (shown as 10B in FIG. 4B), providing a visual indicator that the shaft end 24 is not engaged with the coupling element 70.

The method of assembling the shaft coupling assembly 100 further includes inserting the shaft end 24 in the channel 74 to a second inserted position shown in FIG. 5A, where at the second insertion depth 94 the leading interface portion 32 of the engagement segment 26 is engaged with the receiving interface portion 86 of the channel 74 such that the upper surface 42 of the projection 34 protrudes into the fastener bore 80 as shown in FIG. 5B, thereby preventing a fastener 12 from being extended through the fastener bore 80 and engaging the engaging bore aperture 78.

As shown in FIGS. 3A and 5A-5B, the engagement segment 26 may define one or more shaft orientation features 60 and the coupling interface 76 may define one or more coupling orientation features 88 corresponding to the one or more shaft orientation features 60 where engaging the one or more shaft orientation features 60 with the one or more coupling orientation features 88 orients the shaft end 24 in the channel 74 such that the upper surface 42 of the projection 34 protrudes into the fastener bore 80 to prevent insertion of the fastener 12 through the bore opening, for example, when the shaft end 24 is inserted to the second insertion depth 94, the second insertion depth 94 corresponding to engagement of the leading interface portion 32 of the shaft interface 28 and the receiving interface portion 86 of the coupling interface 76.

The shaft interface 28 may define a plurality of shaft teeth 62 and the coupling interface 76 may define a plurality of coupling teeth 90 corresponding to the plurality of shaft teeth 62 such that, with shaft end 24 inserted into the channel 74 and the engagement segment 26 engaging the coupling interface 76, the plurality of shaft teeth 62 are engaged with the plurality of coupling teeth 90 to restrain rotation of the shaft end 24 in the channel 74 about the longitudinal axis 10, and such that, in an installed position with the fastener 12 engaged in the bore, a clamping force 18 is exerted on the shaft teeth 62 by the coupling teeth 90 meshingly engaged therewith.

In the example shown in FIGS. 3A and FIGS. 4A-6B, the shaft interface 28 may include a plurality of teeth 62, 90 and at least one shaft orientation feature 60 configured as a keyway, and the coupling interface 76 may include a plurality of teeth 62, 90 including at least one coupling orientation feature 88 configured as a blocked tooth defining a key. The at least one keyway 60 and the at least one blocked tooth 88 are arranged such that with shaft end 24 inserted into the channel 74 and the leading interface portion 32 engaging the receiving interface portion 86, the at least one keyway and the at least one blocked tooth are engaged to orient the shaft end 24 in the channel 74 such that the projection 34 protrudes into the fastener bore 80 as the shaft end 24 is progressively inserted into the channel 74 via the receiving shaft end 24 to the first and second insertion depths 92, 94.

The example shown in FIGS. 3A and FIGS. 4A-5B is not intended to be limiting, and other configurations and/or combinations of shaft orientation features 60 and coupling orientation features 88 may be used to orient the shaft end 24 in the channel 74 such that the leading end 38 and the projection 34 upper surface 42 protrude into the fastener bore 80 as the shaft end 24 is progressively inserted into the channel 74. For example, the shaft interface 28 may define a single shaft orientation, where the single shaft orientation feature 60 is positioned relative to the upper surface 42 of the projection 34, and the coupling interface 76 may define a single coupling orientation feature 88 corresponding to the single shaft orientation feature 60 and positioned relative to the fastener bore 80 to ensure the upper surface 42 of the projection 34 protrudes into the fastener bore 80 when the leading interface portion 32 is engaged with the receiving interface portion 86 of the channel 74. In this configuration, the coupling orientation feature 88 may be configured as a blocked tooth or a key, such that insertion of engagement segment 26 into the channel 74 is prevented when the shaft end 24 is rotated to position the shaft orientation feature 60, for example, in the radial space 99 between the first pair of retention features 98.

In another example, one of the engagement segment 26 and the coupling interface 76 defines a first orientation feature, and the other of the engagement segment 26 and the coupling interface 76 defines a plurality of second orientation features 60, 88, wherein the first orientation feature is selectively engageable with each of the plurality of second orientation features 60, 88 to orient the engagement segment 26 in the channel 74 such that the upper surface 42 of the projection 34 protrudes into the fastener bore 80.

In an example shown in FIGS. 3A and 5B, a plurality of shaft orientation features 60 may be defined by the engagement segment 26 and a plurality of coupling orientation features 88 defined by the coupling interface 76, where the shaft and coupling orientation features 60, 88 are arranged such that the shaft end 24 must be oriented in a single orientation only to engage the leading interface portion 32 to the receiving interface portion 86. As illustrated by the example arrangement of shaft keyway orientation features 60 and coupling blocked tooth orientation features 88 shown in FIG. 3A and FIG. 5B, the engagement of the shaft end 24 to the channel 74 in any radial orientation other than the orientation shown in FIG. 5B is blocked by interference of the coupling blocked tooth orientation features 88 with one or more shaft teeth 62.

Figure 8A:
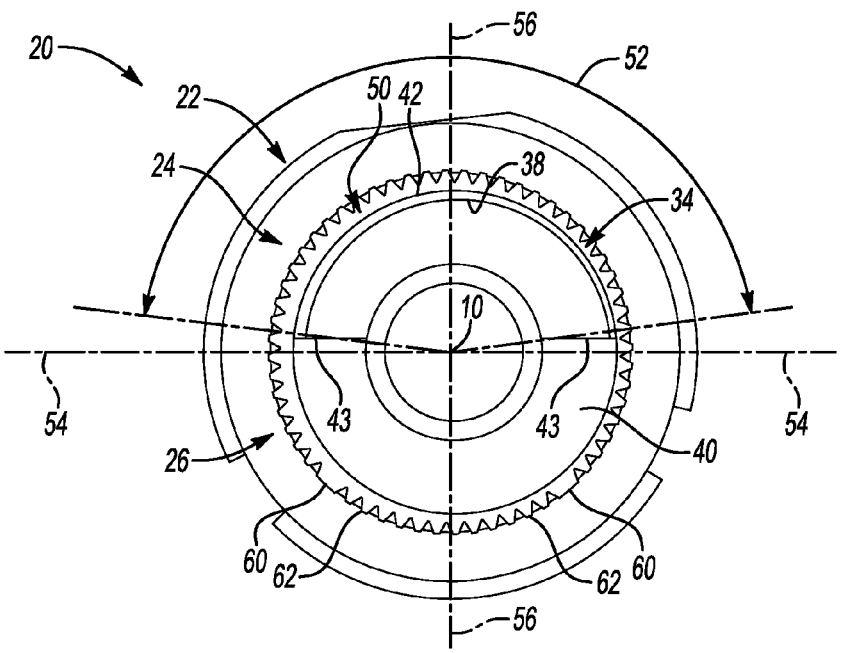
FIG. 8A is a schematic end view of the shaft of FIG. 7.
Figure 10A:
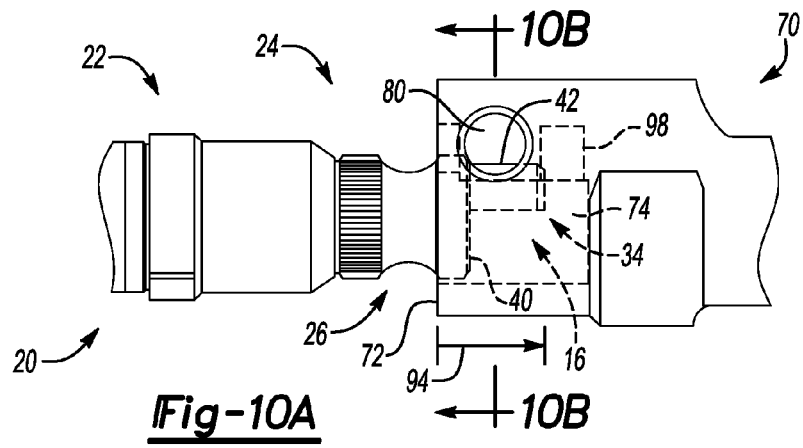
FIG. 10A is a partial schematic side view showing the shaft of FIG. 7 partially inserted into the coupling element in a second position.
Figure 10B:
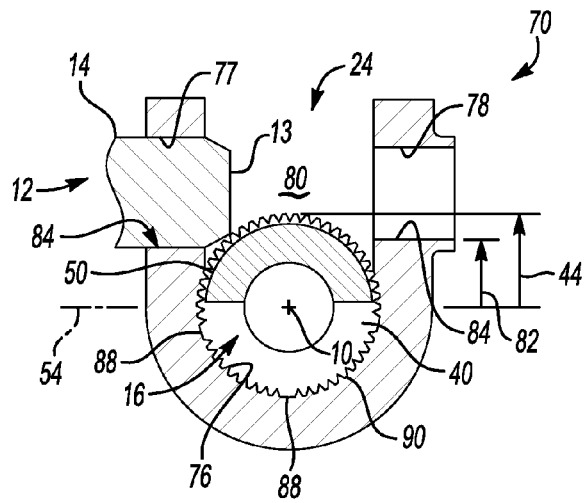
FIG. 10B is a schematic cross-sectional view of section 10B-10B of FIG. 10A showing a transverse cross-section of the projection.
Figure 11A:
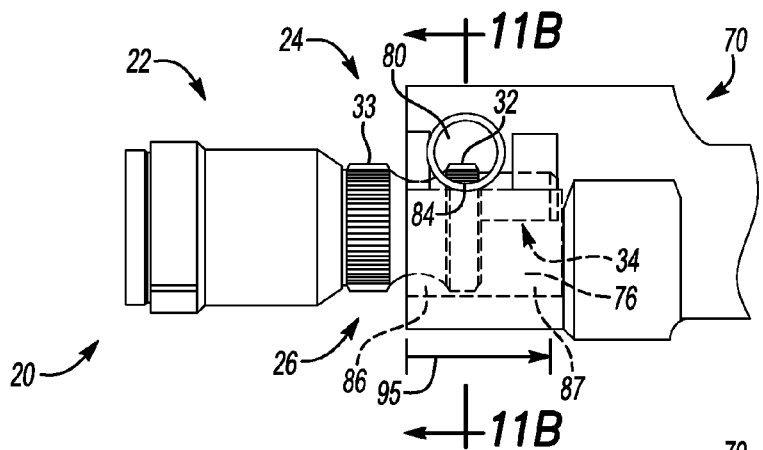
FIG. 11A is a partial schematic side view showing the shaft of FIG. 7 partially inserted into the coupling element in a third position.
Figure 11B:
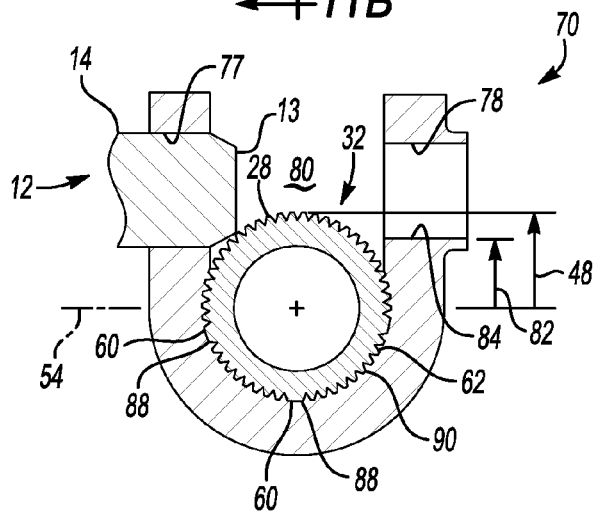
FIG. 11B is a schematic cross-sectional view of section 11B-11B of FIG. 11A.

In another example shown in FIG. 8A and FIG. 10B, at least two of the plurality of shaft orientation features 60 are each respectively engaged with at least two of the plurality of coupling orientation features 88 to orient the engagement segment 26 in the channel 74 such that the upper surface 42 of the projection 34 protrudes into the fastener bore 80.

Referring to the example shown in FIG. 8A and FIGS. 12A-12D, the arrangement and/or number of the shaft orientation features 60 in the plurality of shaft orientation features 60 may differ from the arrangement and/or number of the coupling orientation features 88 in the plurality of coupling orientation features 88 to enable engagement of the leading interface portion 32 to the receiving interface portion 86 with the shaft end 24 in more than one radial orientation relative to the channel 74, where in each of the enabled radial orientations, the upper surface 42 of the projection 34 protrudes into the fastener bore 80 as the shaft end 24 is progressively inserted into the channel 74 to prevent insertion of a fastener 12 through the fastener bore 80 when the engagement segment 26 is engaged with the coupling interface 76 the second insertion depth 94. This configuration provides flexibility and efficiency in assembly of the shaft end 24 to the channel 74 by providing multiple radial orientations of the shaft end 24 relative to the channel 74 where the shaft end 24 may be engaged with the channel 74 in an installed position, where as the shaft end 24 is progressively inserted into the channel 74, the projection 34 protrudes into the fastener bore 80 to prevent engagement of a fastener 12 in the bore prior to positioning the shaft end 24 in the installed position.

Referring now to FIG. 8A, the projection 34 is configured as an arcuate portion 50 positioned completely above a horizontal mid-plane of the shaft 20 defined by a horizontal axis 54 and longitudinal axis 10 of the shaft 20. The engagement segment 26 of the example shaft end 24 includes two shaft orientation features 60 configured as keys and opposing the arcuate portion 50 of the projection 34, such that the shaft orientation features 60 and the arcuate portion 50 are located on opposite sides of the horizontal axis 54. As shown in FIG. 12A, the coupling interface 76 of the example channel 74 includes more than two coupling orientation features 88 which are distributed radially about the channel 74 interface and asymmetrically relative to a horizontal axis 54 of the channel 74. The coupling interface 76 further includes opposing retention features 98 extending into the channel 74 and defining a radial space 99 therebetween.

Figure 12B:
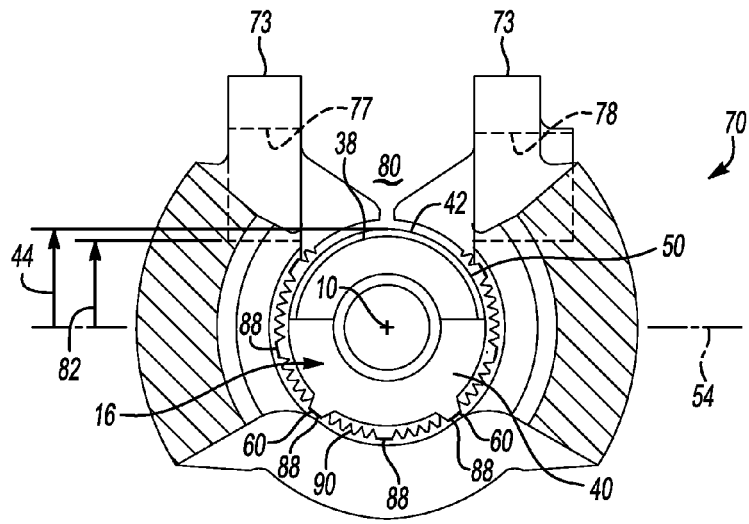
FIG. 12B is a schematic cross-sectional view showing the shaft of FIG. 7 oriented to the coupling element in a first radial orientation.

In a first radial orientation shown in FIG. 12B, the shaft end 24 is radially oriented such that the horizontal axes 54 of the shaft 20 and the channel 74 are substantially coincident, e.g., coincident within customary manufacturing tolerances, and the two shaft orientation features 60 align with a first corresponding pair of non-adjacent coupling orientation features 88 to engage the leading interface portion 32 with the coupling interface 76, such that in the first radial orientation shown in FIG. 12B, the arcuate portion 50 of the projection 34 protrudes into the fastener bore 80 to interfere with a fastener 12 inserted into the fastener bore 80, thus preventing engagement of the fastener 12 to the coupling element 70. As shown in FIG. 12B, the projection radial height 44 of the arcuate portion 50 protruding into the fastener bore 80 is greater than the bore radial height 82.

Figure 12C:
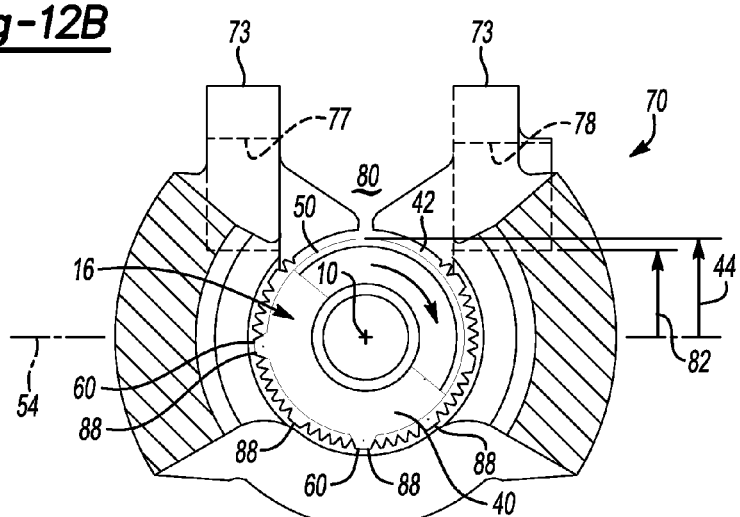
FIG. 12C is a schematic cross-sectional view showing the shaft of FIG. 7 oriented to the coupling element in a second radial orientation.

In a second radial orientation shown in FIG. 12C, the shaft end 24 is rotated clockwise relative to the first radial orientation, and radially oriented such that a portion of the projection 34 extends below the horizontal axis 54 of the channel 74, and the two shaft orientation features 60 align with a second corresponding pair of non-adjacent coupling orientation features 88 to engage the leading interface portion 32 with the coupling interface 76, such that in the second radial orientation shown in FIG. 12C, the arcuate portion 50 of the projection 34 protrudes into the fastener bore 80 to interfere with a fastener 12 inserted into the fastener bore 80, thus preventing engagement of the fastener 12 to the coupling element 70. As shown in FIG. 12C, the projection radial height 44 of the arcuate portion 50 protruding into the fastener bore 80 is greater than the bore radial height 82.

Figure 12D:
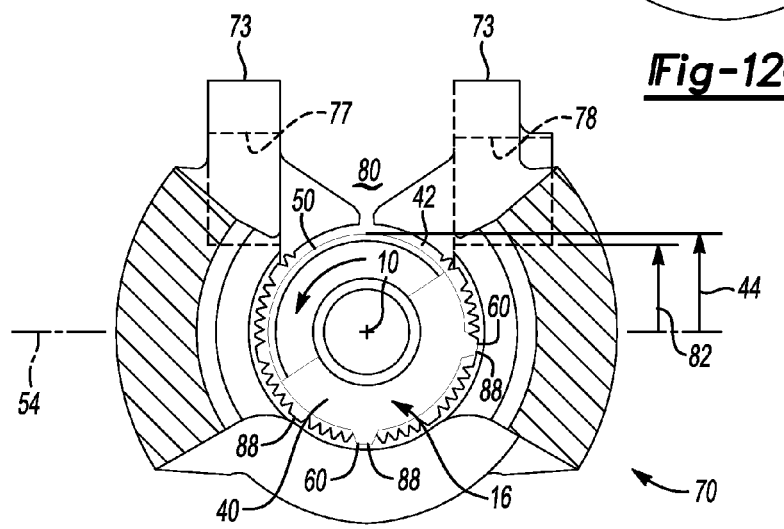
FIG. 12D is a schematic cross-sectional view showing the shaft of FIG. 7 oriented to the coupling element in a first third radial orientation.

In a third radial orientation shown in FIG. 12D, the shaft end 24 is rotated counter-clockwise relative to the first radial orientation, and radially oriented such that a portion of the projection 34 extends below the horizontal axis 54 of the channel 74, and the two shaft orientation features 60 align with a third corresponding pair of non-adjacent coupling orientation features 88 to engage the leading interface portion 32 with the coupling interface 76, such that in the third radial orientation shown in FIG. 12D, the arcuate portion 50 of the projection 34 protrudes into the fastener bore 80 to interfere with a fastener 12 inserted into the fastener bore 80, thus preventing engagement of the fastener 12 to the coupling element 70. As shown in FIG. 12D, the projection radial height 44 of the arcuate portion 50 protruding into the fastener bore 80 is greater than the bore radial height 82.

It would be understood that other radial orientations (not shown) of the shaft end 24 and the channel 74 shown in FIGS. 12B-12D are possible, and that in these additional radial orientations the arcuate portion 50 would protrude into the fastener bore 80 to interfere with a fastener 12 inserted into the fastener bore 80, thus preventing engagement of the fastener 12 to the coupling element 70. It would further be understood that insertion of the engagement segment 26 of the shaft end 24 into the channel 74 with the shaft end 24 in a radial orientation such that the arcuate portion 50 was fully positioned below the horizontal axis 54 of the channel 74 would be prevented by interference of the shaft orientation features 60 with at least one of the coupling teeth 90 and a coupling retention feature 98.

Referring again to FIGS. 4A-6B, the method of assembling the shaft coupling assembly 100 may further include inserting the shaft end 24 in the channel 74 to a third inserted position shown in FIG. 6A, and corresponding to a third insertion depth 95, where at the third inserted position the leading interface portion 32 of the engagement segment 26 is engaged with the coupling interface 76 of the channel 74 such that the leading interface portion 32 protrudes into the fastener bore 80. In the example shown, the leading interface portion 32 of the engagement segment 26, in the third inserted position, may be engaged with the coupling interface 76 intermediate the receiving and terminating interface portions 86, 87 of the coupling interface 76. In the third inserted position, as shown in FIG. 6B, the leading interface portion 32 at least partially protrudes into the fastener bore 80 such that the leading interface portion 32 interferes with insertion of a fastener 12 into the fastener bore 80 thereby preventing the fastener 12 from being extended through the fastener bore 80 and engaging the engaging bore aperture 78.

The method further includes inserting the shaft end 24 in the channel 74 to the installed depth 96 shown in FIGS. 2A-2C, wherein the installed position the engagement segment 26 of the shaft end 24 is engaged with the coupling interface 76 such that the recess 30 is aligned with the fastener bore 80 to receive a fastener 12 extended through the fastener bore 80 and the recess 30. Further, in the installed position the leading interface portion 32 of the shaft interface 28 is engaged with the terminating interface portion 87 of the coupling interface 76, and the trailing interface portion 33 of the shaft interface 28 is engaged with the receiving interface portion 86 of the coupling interface 76.

The method continues with inserting the fastener 12 through the fastener bore 80 including the receiving bore aperture 77, the bore portion intermediate the receiving bore and the engaging bore aperture 77, 78 now partially defined by the recess 30 of the shaft end 24 at the installed depth 96, and the engaging bore aperture 78, and operatively fastening the fastener 12 to the coupling element 70 such that the coupling interface 76 exerts a clamping force 18 on the shaft interface 28 and the fastener 12 engages the recess 30 to restrain the shaft end 24 in the channel 74. As described previously herein the coupling interface 76 and the shaft interface 28 may define at least one of corresponding threads and/or corresponding orientation features 60, 88, wherein operatively fastening the fastener 12 to the coupling element 70 causes a clamping force 18 to be exerted by the coupling teeth 90 and/or coupling orientation features 88 on the respective corresponding shaft teeth 62 and/or shaft orientation features 60 to restrain the shaft end 24 in the channel 74 and/or to constrain radial rotation of the shaft end 24 relative to the channel 74.

As referred to herein, the first, second and third inserted positions each correspond to a first, second and third insertion depth 92, 94, 95, where each of the first, second and third insertion depths 92, 94, 95 represents a range of insertion depths 92, 94, 95 defined by a condition associated with the inserted position, and such that it is not intended that any one of the first, second and third inserted positions 92, 94, 96 be limited to a single axial location of the shaft end 24 relative to the channel 74. For example, the first insertion depth 92 represents and/or includes a range of insertion depths 92, 94, 95 beginning with a minimum first insertion depth 92 at which the leading end 38 of the projection 34 protrudes sufficiently into the fastener bore 80 to interfere with a fastener 12 inserted into the fastener bore 80 with the engagement portion not engaged to the channel 74, wherein progressively inserting the projection 34 into the channel 74 progressively increases the first insertion depth 92 to a maximum first insertion depth 92 substantially corresponding to the projection length 36, e.g., corresponding to the maximum insertion depth of the projection 34 into the channel 74 without engaging the leading interface portion 32 of the engagement segment 26 to the receiving interface portion 86 of the coupling interface 76, wherein at the maximum first insertion depth 92 the upper surface 42 of the projection 34 protrudes into the fastener bore 80 and the leading end 38 of the projection 34 may protrude into the fastener bore 80 or may be extended past the fastener bore 80, as determined by the projection length 36 and the fastener bore 80 configuration.

By way of example, the minimum second insertion depth 94 corresponds to the insertion depth where the leading interface portion 32 first engages the receiving interface portion 86, and the maximum second insertion depth 94 corresponds to the insertion depth where the upper surface 42 of the projection 34 adjacent the engagement portion no longer protrudes into the fastener bore 80. Similarly, the minimum third insertion depth 95 corresponds to the insertion depth where the leading interface portion 32 adjacent the projection 34 first protrudes into the fastener bore 80, and the maximum third insertion depth 95 corresponds to the insertion depth where the leading interface portion 32 adjacent the recess 30 no longer protrudes into the fastener bore 80. Further, it would be understood that the respective ranges of the second and third insertion depths 94, 95 may overlap, such that when a portion of both the leading interface portion 32 and the upper surface 42 of the projection 34 are protruding in the fastener bore 80, the shaft end 24 may be described as being positioned at both a second insertion depth 94 and a third insertion depth 95.

Referring now to FIGS. 7-12D, shown is a shaft 20 having a shaft end 24 including a second example configuration of a projection 34, indicated as a projection 34B in FIG. 7, extending axially from the engagement segment 26 of the shaft end 24. The shaft 20 of FIG. 7 including the shaft end 24 and projection 34 functions substantially as described for the shaft 20 of FIG. 1. As described previously herein, the example configuration of the projection 34 shown in FIGS. 7-12D includes an arcuate portion 50, indicated as an arcuate portion 50B in FIG. 7, which is subtended by an angle 52 no greater than 180 degrees, and preferably no greater than 170 degrees, such that the projection 34 shown in FIG. 7 and in further detail in FIGS. 8A-8B is positioned completely above the horizontal mid-plane of the shaft 20. The projection 34 shown in FIG. 7 may be described as a truncated cylinder, such that a lower surface 43 of the projection 34 is defined by a plane determined by a non-diameter chord of the cylinder, and such that the lower surface 43 generally opposes the upper surface 42 of the projection 34, wherein the upper surface 42, indicated as upper surface 42B in FIG. 7, is defined by the arcuate portion 50. The projection 34 has a cross-sectional area substantially less than a cross-sectional area of the leading interface portion 32, such that a transition surface 40 bounded by the leading interface portion 32 and the projection 34 has a cross-sectional area greater than the cross-sectional area of the projection 34. The projection 34 is characterized by a projection length 36 (see FIG. 8B) and defines a leading end 38, indicated as a leading end 38B in FIG. 7, which is presented to the shaft receiving end 72 of the coupling element 70 during insertion of the shaft end 24 into the channel 74 of the coupling element 70. As shown in FIG. 9A, the projection length 36 of the projection 34 is greater than the axial length of the channel 74 intermediate the shaft receiving end 72 and the fastener bore 80, e.g., greater than the axial length of a receiving interface portion 86 of the coupling interface 76, such that with the shaft end 24 inserted into the channel 74 via the shaft receiving end 72, the leading end 38 of the projection 34 protrudes into the bore without engaging the leading portion of the shaft interface 28 with the coupling interface 76. As shown in FIG. 9B, with the shaft end 24 inserted to a first insertion depth 92 such that the leading end 38 of the projection 34 protrudes into the bore without engaging the engagement segment 26 and the coupling interface 76, a displacing force 19 may be exerted on the protruding leading end 38 by the fastener 12 inserted into the fastener bore 80, causing the projection 34 to be displaced into the clearance gap 16 defined by the transition surface 40 and the coupling interface 76. The displacement of the shaft end 24 by the fastener 12 inserted in the coupling element 70 may skew the shaft longitudinal axis (shown as 10A in FIG. 9B) relative to coupling longitudinal axis 10 (shown as 10B in FIG. 9B), providing a visual indicator that the shaft end 24 is not engaged with the coupling element 70.

The projection 34 further defines an upper surface 42 such that in the installed orientation, the shaft end 24 is presented to the channel 74 with the leading end 38 and the upper surface 42 generally aligned with the open side of the channel 74, e.g., generally aligned between opposing walls 73 of the coupling element 70 defining the channel 74, and such that upon insertion of the projection 34 into the channel 74, the transition surface 40 defines a clearance gap 16 (see FIGS. 9A-9B) between the projection 34 and the coupling interface 76, and the upper surface 42 is adjacent the fastener bore 80. As shown in FIGS. 7-8B, FIG. 11B, and FIGS. 12B-12D, the engagement segment may define one or more shaft orientation features 60 and the coupling interface 76 may define one or more coupling orientation features 88 corresponding to the one or more shaft orientation features 60 where engaging the one or more shaft orientation features 60 with the one or more coupling orientation features 88 orients the shaft end 24 in the channel 74 such that the upper surface 42 of the projection 34 protrudes into the fastener bore 80 to prevent insertion of the fastener 12 through the bore opening, for example, when the shaft end 24 is inserted to a second insertion depth 94, where the second insertion depth 94 corresponds to engagement of the leading interface portion 32 of the shaft interface 28 and the receiving interface portion 86 of the coupling interface 76.

Figure 8B:
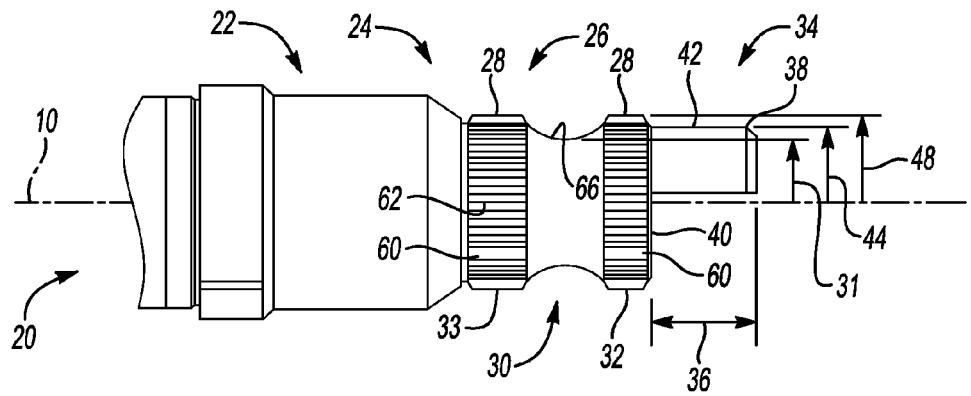
FIG. 8B is a partial schematic side view of the shaft of FIG. 7.
Figure 9A:
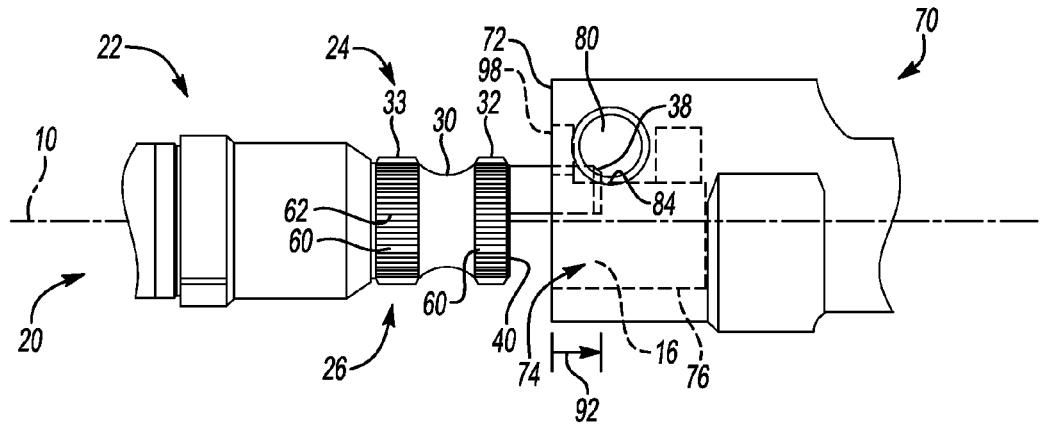
FIG. 9A is a partial schematic side view showing the shaft of FIG. 7 partially inserted into the coupling element in a first position.
Figure 9B:
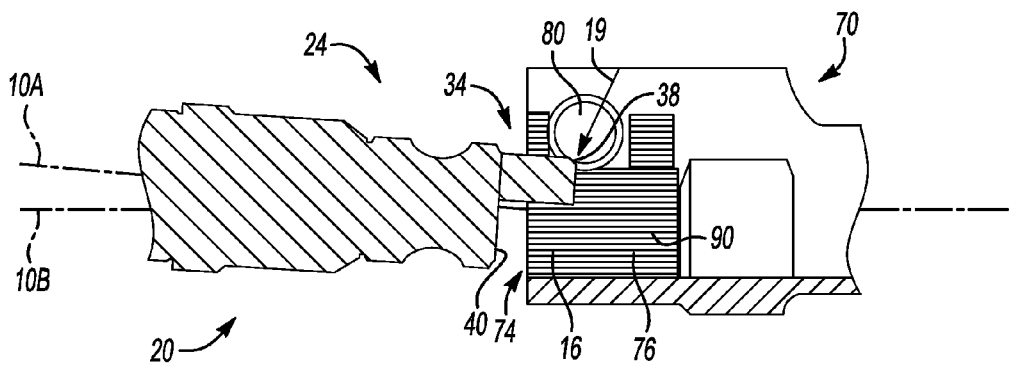
FIG. 9B is a partial cross-sectional view of FIG. 9A showing the shaft of FIG. 7 partially inserted into the coupling element in the first position.

The projection 34 upper surface 42 may be characterized by a projection radial height 44 defined relative to a longitudinal axis 10 of the shaft 20, as shown in FIG. 8B, where the projection radial height 44 is greater than the bore radial height 82 as shown in FIG. 10B, and such that with the leading interface portion 32 of the engagement segment 26 engaged with the receiving interface portion 86 of the channel 74, the projection 34 upper surface 42 protrudes into the bore opening to prevent insertion of the fastener 12 through the bore opening, as shown in FIGS. 10A and 10B. As shown in FIG. 8B, the projection radial height 44 may be less than a shaft interface radial height 48 defined by the leading interface portion 32 and the longitudinal axis 10 of the shaft 20, such that the projection 34 upper surface 42 in the example shown is noncontiguous with the shaft interface 28.

The projection 34 may define a transverse cross-section having an arcuate portion 50, where the arcuate portion 50 defines the upper surface 42 of the projection 34. The arcuate portion 50 may be subtended by an angle 52 of less than 180 degrees, the subtending angle 52 originating from a longitudinal axis 10 of the shaft 20, as shown in the FIG. 3A, and such that the arcuate portion 50 is positioned completely above the horizontal mid-plane of the shaft body 22. In a preferred embodiment, the arcuate portion 50 is subtended by an angle 52 no greater than 170 degrees, such that the projection width 68 measured parallel to the horizontal axis 54 is less than the shaft interface diameter 46, and such that the transition surface 40 bounded therebetween defines a clearance gap 16 which include lateral clearance between the projection 34 and the coupling interface 76 in and adjacent to the horizontal mid-plane with the shaft end 24 inserted in the channel 74.

A method for assembling the shaft end 24 of the shaft 20 of FIG. 7 to a coupling element 70 to form a shaft coupling assembly 100 is illustrated by FIGS. 9A-10B, where the method of assembling the shaft coupling assembly 100 including a shaft 20 having a projection 34 as shown in FIGS. 7-10B is substantially as described for FIGS. 1-6B.

While the best modes for carrying out the invention have been described in detail, those familiar with the art to which this invention relates will recognize various alternative designs and embodiments for practicing the invention within the scope of the appended claims.

The invention claimed is:

1. A shaft coupling assembly comprising:
  a shaft including a shaft body and a shaft end;
  the shaft end including:
    an engagement segment extending axially from the shaft body;
    the engagement segment defining a shaft interface including a fastener receiving recess and a leading interface portion;
    a projection extending axially from the leading interface portion of the engagement segment and having a cross-sectional area less than a cross-sectional area of the leading interface portion;
    the projection characterized by a projection length and defining a leading end;
  a coupling element including:
    a shaft receiving end;
    a channel defining a coupling interface corresponding to the shaft interface;
    a receiving bore aperture and an engaging bore aperture defining a fastener bore;
    the channel in communication with the shaft receiving end and the fastener bore;
  wherein the projection length is greater than an axial length of the channel intermediate the shaft receiving end and the fastener bore, such that with the shaft end inserted into the channel via the shaft receiving end, the leading end of the projection protrudes into the bore without engaging the leading interface portion of the shaft interface with the coupling interface;
  the projection having an upper surface characterized by a projection radial height defined relative to a longitudinal axis of the shaft;
  the fastener bore having a bore radial height defined by a bottom of the fastener bore and a longitudinal axis of the channel;
  wherein the projection radial height is greater than the bore radial height;
  wherein the projection radial height is less than a shaft interface radial height defined by the leading interface portion and the longitudinal axis of the shaft.

2. The assembly of claim 1, further comprising:
  a transition surface bounded by the leading interface portion and the projection;
  such that with the projection inserted into the channel, the transition surface defines a clearance gap between the projection and the coupling interface.

3. The assembly of claim 1, wherein:
  the projection defines a transverse cross-section having an arcuate portion subtended by an angle of not greater than 170 degrees, the angle originating from a longitudinal axis of the shaft; and
  the arcuate portion defines the upper surface of the projection.

4. The assembly of claim 3, wherein:
  the projection is positioned completely above a horizontal mid-plane of the shaft body and subtended by an angle not greater than 170 degrees, the angle originating from the longitudinal axis of the shaft.

5. The assembly of claim 3, wherein:
  the transverse cross-section further includes a V-shaped portion contiguous with the arcuate portion such that the transverse cross-section is teardrop-shaped; and
  the V-shaped portion extends through a horizontal mid-plane of the shaft body.

6. The assembly of claim 1, further comprising:
  the coupling interface including a receiving interface portion intermediate the shaft receiving end and the fastener bore;
  wherein with shaft end inserted into the channel via the shaft receiving end such that the leading interface portion is engaged with the receiving interface portion, the upper surface of the projection protrudes into the fastener bore thereby preventing a fastener from being extended through the fastener bore to engage the engaging bore aperture.

7. The assembly of claim 1, further comprising:
  a shaft orientation feature defined by the engagement segment;
  a coupling orientation feature defined by the coupling interface and corresponding to the shaft orientation feature;

wherein with shaft end inserted into the channel via the shaft receiving end such that the shaft interface engages with the coupling interface, the shaft orientation feature and the coupling orientation feature are engaged to orient the shaft end in the channel such that the upper surface of the projection protrudes into the fastener bore.

8. The assembly of claim 7, wherein:
the shaft orientation feature is one of a key and a keyway; and
the coupling orientation feature is the other of a key and a keyway.

9. The assembly of claim 1, further comprising:
a plurality of shaft orientation features defined by the engagement segment;
a plurality of coupling orientation features defined by the coupling interface;
wherein with the shaft end inserted into the channel via the shaft receiving end such that the engagement segment engages with the coupling interface, at least two of the plurality of shaft orientation features are each respectively engaged with at least two of the plurality of coupling orientation features to orient the engagement segment in the channel such that the upper surface of the projection protrudes into the fastener bore.

10. The assembly of claim 1, wherein:
one of the engagement segment and the coupling interface defines a first orientation feature;
the other of the engagement segment and the coupling interface defines a plurality of second orientation features;
wherein the first orientation feature is selectively engageable with each of the plurality of second orientation features to orient the engagement segment in the channel such that the upper surface of the projection protrudes into the fastener bore.

11. The assembly of claim 1, wherein:
the shaft interface defines a plurality of shaft teeth;
the coupling interface defines a plurality of coupling teeth; and
with the shaft end inserted into the channel via the shaft receiving end such that the engagement segment engages with the coupling interface, the plurality of shaft teeth are engaged with the plurality of shaft teeth.

12. A method of assembling a shaft and a coupling element, wherein:
the coupling element includes:
a shaft receiving end;
a channel defining a coupling interface;
a receiving bore aperture and an engaging bore aperture defining a fastener bore;
the channel in communication with the shaft receiving end and the fastener bore;
the fastener bore having a bore radial height defined by a bottom of the fastener bore and a longitudinal axis of the channel;
the coupling interface including a receiving interface portion intermediate the shaft receiving end and the fastener bore;
the shaft end includes:
an engagement segment extending axially from the shaft body;
the engagement segment defining a shaft interface including a leading interface portion and a fastener receiving recess;
the shaft interface corresponding to the coupling interface;
a projection extending axially from the leading interface portion of the engagement segment and defining an upper surface and a leading end;
the upper surface characterized by a projection radial height defined relative to a longitudinal axis of the shaft;
wherein the projection radial height is greater than the bore radial height;
the projection having a projection length greater than an axial length of the channel intermediate the shaft receiving end and the fastener bore;
the method comprising:
progressively inserting the shaft end of the shaft into the channel via a shaft receiving end of the coupling from a first insertion depth to an installed depth;
wherein:
at the first insertion depth the leading end of the projection protrudes into the bore without engaging the leading interface portion of the shaft interface with the coupling interface;
at a second insertion depth the leading interface portion of the engagement segment is engaged with the receiving interface portion of the channel such that the upper surface of the projection protrudes into the fastener bore thereby preventing a fastener from being extended through the fastener bore and engaging the engaging bore aperture;
at the installed depth the shaft interface is in engaged with the coupling interface such that the fastener receiving recess is aligned with the fastener bore to receive a fastener extended through the fastener bore and the fastener receiving recess;
inserting the fastener through the receiving bore aperture, the fastener receiving recess and the engaging bore aperture; and
operatively fastening the fastener to the coupling element such that the coupling interface exerts a clamping force on the shaft interface and the fastener engages the fastener receiving recess to restrain the shaft end in the channel at the installed depth;
the engagement segment includes a shaft orientation feature defined by the shaft interface;
the channel includes a coupling orientation feature defined by the coupling interface and corresponding to the shaft orientation feature;
the method further comprising:
orienting the shaft end to the channel such that the shaft orientation feature and the coupling orientation feature are engaged when the shaft end is inserted to the second insertion depth;
wherein engagement of the shaft orientation feature and the coupling orientation feature orient the shaft end in the channel such that the upper surface of the projection protrudes into the fastener bore.

13. The method of claim 12, wherein:
the engagement segment includes a transition surface bounded by the leading interface portion and the projection such that with the projection inserted into the channel, the transition surface defines a clearance gap between the projection and the coupling interface;
the method further comprising:
with the shaft end inserted in the channel at the first insertion depth, inserting the fastener through the receiving bore aperture and into the fastener bore such that the fastener interferes with the leading edge of the projection protruding into the fastener bore; and displacing the shaft end into the clearance gap using the fastener and such that the shaft is displaced axially relative to the channel.

14. The method of claim 12, wherein:

the projection defines a transverse cross-section having an arcuate portion subtended by an angle not greater than 170 degrees, the angle originating from a longitudinal axis of the shaft;

the arcuate portion defines the upper surface of the projection; and the projection radial height is less than a shaft interface radial height defined by the leading interface portion and the longitudinal axis of the shaft.

15. A shaft coupling assembly comprising:

a coupling element including:
   a shaft receiving end;
   a channel defining a coupling interface;
   a receiving bore aperture and an engaging bore aperture defining a fastener bore;
   the channel in communication with the shaft receiving end and the fastener bore;
   the coupling interface including a receiving interface portion intermediate the shaft receiving end and the fastener bore;

a shaft having a longitudinal axis and including a shaft body and a shaft end;

the shaft end including:
   an engagement segment extending axially from the shaft body;
   the engagement segment defining a shaft interface including a leading interface portion;
   the leading interface portion having a interface radial height;
   the engagement segment including a fastener receiving recess having a recess radial height such that with the shaft end in an installed position the fastener receiving recess is aligned with the fastener bore to receive a fastener inserted through the fastener bore;
   a projection extending axially from the leading interface portion of the engagement segment and having a projection radial height;
   wherein the interface radial height, the recess radial height, and the projection radial height are measured from the longitudinal axis of the shaft;
   wherein the projection radial height is greater than the recess radial height and less than the interface radial height;

wherein with the shaft end inserted into the channel via the shaft receiving end and the leading interface portion engaged with the receiving interface portion, the projection protrudes into the fastener bore such that the fastener is prevented from being inserted through the fastener bore.

16. The assembly of claim 15, further comprising:

the projection having a projection length greater than the axial length of the receiving interface portion;

the projection defining a teardrop shaped cross-section including:
   an arcuate portion subtended by an angle not greater than 170 degrees, the angle originating from the longitudinal axis of the shaft;
   a V-shaped portion extending through a horizontal midplane of the shaft body; and such that with the projection inserted in the channel, the V-shaped portion defines a clearance gap between the projection and the coupling interface.

17. The assembly of claim 15, wherein:

the shaft interface defines a plurality of teeth and at least one keyway;

the coupling interface defines a plurality of teeth including at least one blocked tooth defining a key; and the at least one keyway and the at least one blocked tooth are arranged such that with the shaft end inserted into the channel and the leading interface portion engaging the receiving interface portion, the at least one keyway and the at least one blocked tooth are engaged to orient the shaft end in the channel such that the projection protrudes into the fastener bore.

* * * * *